US010771551B2

(12) United States Patent
Wang et al.

(10) Patent No.: US 10,771,551 B2
(45) Date of Patent: Sep. 8, 2020

(54) DYNAMIC TOPOLOGY SWITCH FOR DATA REPLICATION (71) Applicant: SAP SE, Walldorf (DE)

(72) Inventors: Zheng-Wei Wang, Shanghai (CN); Jian Luo, Shanghai (CN); Yi Chen, Shanghai (CN); Weizhong Qiu, Shanghai (CN); Huizi Liu, Shanghai (CN); Du Xue, Shanghai (CN)

(73) Assignee: SAP SE, Walldorf (DE)

( * ) Notice: Subject to any disclaimer, the term of this patent is extended or adjusted under 35 U.S.C. 154(b) by 237 days.

(21) Appl. No.: 15/471,294

(22) Filed: Mar. 28, 2017

(65) Prior Publication Data

US 2018/0288146 A1 Oct. 4, 2018

(51) Int. Cl.
*H04L 29/08* (2006.01)
*H04L 12/24* (2006.01)
*H04L 29/14* (2006.01)

(52) U.S. Cl.
CPC ...... *H04L 67/1095* (2013.01); *H04L 41/0663* (2013.01); *H04L 41/12* (2013.01); *H04L 69/40* (2013.01)

(58) Field of Classification Search
CPC ..... H04L 67/1095; H04L 69/40; H04L 41/12; H04L 41/0654
See application file for complete search history.

(56) References Cited

U.S. PATENT DOCUMENTS 7,523,223 B2  4/2009  Chen et al.
8,543,972 B2  9/2013  Chen et al.
8,650,150 B2  2/2014  Zhao et al.
8,935,207 B2  1/2015  Wankawala et al.
8,996,545 B2  3/2015  Chen et al.
9,009,140 B2  4/2015  Chen et al.
9,015,651 B2  4/2015  Chen et al.
9,104,724 B2  8/2015  Liu et al.
9,160,820 B2  10/2015  Chen et al.
9,213,771 B2  12/2015  Chen et al.
9,311,345 B2  4/2016  Chen et al.
9,342,573 B2  5/2016  Chen et al.
9,418,091 B2  8/2016  Li et al.
9,563,686 B2  2/2017  Chen et al.
9,880,777 B1 *  1/2018  Bono ................... G06F 3/065
2004/0133718 A1 *  7/2004  Kodama ............. G06F 3/0605
                                                              710/74
2013/0326346 A1  12/2013  Zhu et al.
2014/0258321 A1  9/2014  Liu et al.

* cited by examiner

*Primary Examiner* — Feben Haile
(74) *Attorney, Agent, or Firm* — Fish & Richardson P.C.

(57) ABSTRACT

The present disclosure involves systems, software, and computer implemented methods for performing dynamic topology switch in a failover operation. In one example, a failover of a first node is determined. The first node includes a first data server and a first replication server. At least one user application connects to the first data server prior to the failover of the first node. In response to the determined failover, the at least one user application is connected to a second data server of a second node. The second node includes the second data server and a second replication server. Prior to the failover of the first node, a data replication topology of the second node is a remote topology. During the failover, if the first replication server on the first node is down, the data replication topology of the second node is switched from the remote topology to a local topology.

18 Claims, 4 Drawing Sheets

DYNAMIC TOPOLOGY SWITCH FOR DATA REPLICATION

TECHNICAL FIELD

The present disclosure relates to systems, software, and computer-implemented methods for performing dynamic topology switch in a failover operation.

BACKGROUND

In the current ASE (Adaptive Server Enterprise) HADR (high availability disaster recovery) with external replication system, remote topology is used for data replication. After the HADR system is setup, the remote topology cannot be changed. During a failover process, data activities on a primary node are switched to a standby node. Since the standby node uses remote topology for data replication, data is replicated from a data server on the standby node to an external data server through a replication server on the primary node. If the replication server on the primary node is down during the failover process, data cannot be replicated from the data server on the standby node to the external data server until the replication server on the primary node recovers.

SUMMARY

The present disclosure describes methods and systems, including computer-implemented methods, computer program products, and computer systems for switching data replication topology in a failover operation. In an implementation, a failover of a primary node in an Adaptive Server Enterprise (ASE) high availability disaster recovery (HADR) with external replication system is determined. The ASE HADR system includes the primary node, a standby node, and an external replication system. The primary node includes a first ASE data server and a first replication server. The standby node includes a second ASE data server and a second replication server. At least one user application connects to the first ASE data server prior to the failover of the primary node. Prior to the failover of the primary node, data replication topologies of both the primary node and the standby node are remote topology. In the remote topology, replication data of the first ASE data server is routed from the first ASE data server through the second replication server on the standby node to the external replication system. In response to the determined failover of the primary node, the at least one user application is connected to the second ASE data server of the standby node. During the failover, if the first replication server on the primary node is working, the data replication topology of the standby node remains unchanged (i.e., in the remote topology). In the remote topology, replication data of the second ASE data server is routed from the second ASE data server through the first replication server on the primary node to the external replication system. On the other hand, if the first replication server on the primary node is down during the failover, the data replication topology of the standby node is switched from the remote topology to a local topology. In the local topology, replication data of the second ASE data server is routed from the second ASE data server through the second replication server on the standby node to the external replication system.

While generally described as computer-implemented software embodied on non-transitory, tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The following detailed description describes performing dynamic topology switching in a failover operation and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications, without departing from scope of the disclosure. Thus, the present disclosure is not intended to be limited to the described or illustrated implementations, but is to be accorded the widest scope consistent with the principles and features disclosed herein.

In an Adaptive Server Enterprise (ASE) high availability disaster recovery (HADR) with external replication system, data changes in a source data server (e.g., a data server on a primary node of a HADR cluster) are replicated to a target data server (e.g., a data server on a standby node of the HADR cluster, an external data server on an external replication system) to protect against data loss during partial or complete site failures of the source data server. In the current HADR system, remote topology is used for data replication. For example, data is replicated from a data server on a primary node to a replication server on a standby node. The replication server on the standby node applies the data on a data server on the standby node and, at the same time, routes the data to an external replication server on an external replication system. The external replication server applies the data on a data server on the external replication system.

During a failover process, data activities on a primary node are switched to a standby node. Since the standby node uses remote topology for data replication, data is replicated from a data server on the standby node to a replication server on the primary node. However, if the failover is an unplanned failover (e.g., triggered by a failure of both the data server and the replication server of the primary node), with the remote topology data cannot be replicated from the data server on the standby node until the replication server on the primary node recovers. This affects the availability of the external replication of the HADR system.

This disclosure provides a dynamic topology switching technique that makes the external replication available before the replication server on the primary node recovers. By implementing the dynamic topology switch, the HADR system can be reconfigured to a local topology for data replication during a failover process to avoid data replication through the failed replication server on the primary node. For example, if both the data server and the replication server on the primary node are down, an unplanned failover is triggered and the data server on the standby node is promoted to a new primary data server immediately. User application that was previously connected to the data server on the primary node can connect to the new primary data server on the standby node to continue their work. In addition, a remote topology of the HADR system is switched to a local topology for data replication. With the local topology implemented, data is replicated from the new primary data server on the standby node to a replication server on the standby node, instead of to the failed replication server on the primary node. As a result, data replication to external systems recovers immediately after an unplanned failover, even when the replication server on the primary node is not recovered. With the dynamic topology switch, the unavailable time of external replication during a HADR internal unplanned failover can be reduced and the availability of the HADR system can be enhanced. The dynamic topology switching concept can be used for other disaster recovery systems in addition to the ASE HADR with external replication system.

Figure 1:
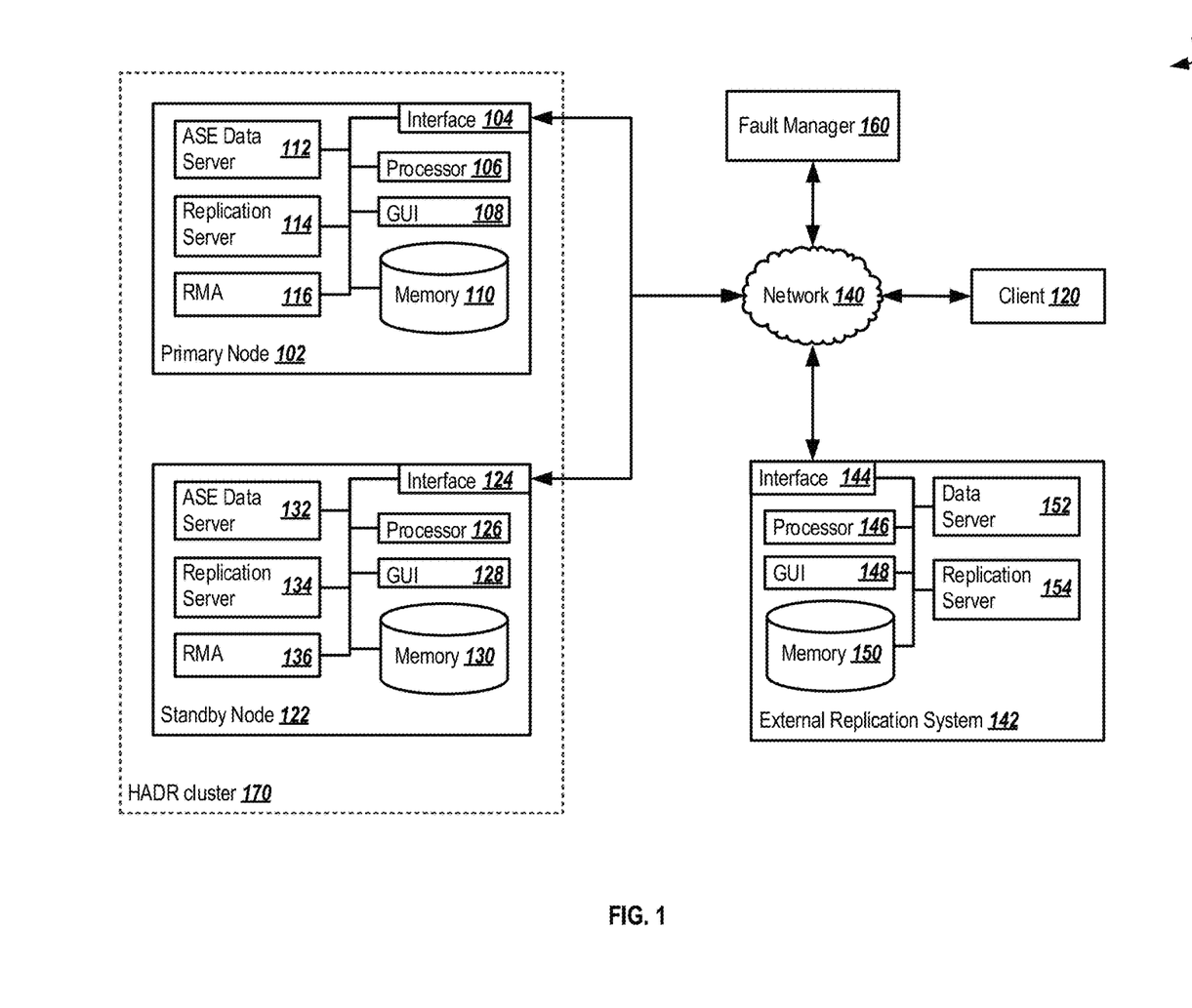
FIG. 1 is a block diagram illustrating an example system for performing dynamic topology switch in a failover operation, according to an implementation.

Turning to the illustrated embodiment, FIG. 1 is a block diagram illustrating an example system 100 for performing dynamic topology switch in a failover operation. Specifically, the illustrated system 100 includes, or is communicably coupled with, a HADR cluster 170 including a primary node 102 and a standby node 122, an external replication system 142, fault manager 160, client 120 (or clients 120), and a network 140. In some implementations, the illustrated system 100 may include additional components and/or different components, not shown in the diagram, such as additional node (or nodes). Although shown separately, in some implementations, functionality of two or more nodes or systems may be provided by a single system or server. In some implementations, the functionality of one illustrated node or system may be provided by multiple nodes or systems. Additionally, while illustrated as a client-server system, alternative implementations of the solution may be used to allow for client to client transfers, server-to-server transfers, and client- and/or server-to-cloud or other system transfers, as appropriate.

As used in the present disclosure, the term "computer" is intended to encompass any suitable processing device. For example, primary node 102 may be any computer or processing device such as, a blade server, general-purpose personal computer (PC), Mac®, workstation, UNIX-based workstation, or any other suitable device. Moreover, although FIG. 1 illustrates primary node 102 as a single node, primary node 102 can be implemented using two or more systems, as well as computers other than servers, including a server pool. In other words, the present disclosure contemplates computers other than general-purpose computers, as well as computers without conventional operating systems. Further, illustrated primary node 102, standby node 122, client 120, and the external replication system 142 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable servers or computers.

In general, primary node 102 and/or standby node 122 may be any suitable computing server or system executing applications related to providing high availability database service. The primary node 102 and/or the standby node 122 are described herein in terms of responding to requests for database service from users at client 120 and other clients, as well as other systems communicably coupled to network 140 or directly connected to the primary node 102. However, the primary node 102 and/or the standby node 122 may, in some implementations, be a part of a larger system providing additional functionality. For example, primary node 102 and/or standby node 122 may be part of an enterprise business application or application suite providing one or more of enterprise relationship management, data management systems, customer relationship management, and others. In some implementations, the primary node 102 and/or the standby node 122 may be associated with a particular uniform resource locator (URL) for web-based applications. The particular URL can trigger execution of multiple components and systems.

Primary node 102 and/or standby node 122 may be a logical node, host, or site in the ASE HADR with external replication system. For example, the primary node 102 can be a primary host of a data server and provide database service to client 120. The standby node 122 can be a standby host of a data server having a database replication feature that provides a high availability solution for both partial and complete site failures of the primary node 102. The primary node 102 and the standby node 122 can switch roles in a failover operation. Failover is switching activity from a primary server to a standby server. Failover can be planned or unplanned. A planned failover occurs on a scheduled time (e.g., a maintenance, a test), and both the primary and standby servers are working. An unplanned failover is unscheduled, occurring unintentionally and without warning (e.g., primary server crashed or is otherwise unavailable). When the primary node 102 is down, the standby node 122 can be promoted to a new primary node while the primary node 102 becomes a new standby node. As a newly promoted primary node, the node 122 is connected to the client 120 and provides database service to the client 120. As illustrated in FIG. 1 and described below, the primary node 102 and the standby node 122 have similar components and perform similar functionalities. In some implementations, the primary node 102 and the standby node 122 have different components and perform different functionalities.

As illustrated, primary node 102 includes an interface 104, a processor 106, an optional graphical user interface (GUI) 108, memory 110, an ASE data server 112, a replication server 114, and a replication management agent (RMA) 116. In general, the primary node 102 is a simplified representation of one or more systems and/or servers that provide the described functionality, and is not meant to be limiting, but rather an example of the systems possible.

The interface 104 is used by the primary node 102 for communicating with other nodes in a distributed environment—including within the system 100—connected to the network 140 (e.g., client 120, standby node 122, external replication system 142, and other systems communicably coupled to the network 140). The interface 104 may comprise logic encoded in software and/or hardware in a suitable combination and operable to communicate with the network 140, the ASE data server 112, the replication server 114, and/or the RMA 116. More specifically, the interface 104 may comprise software supporting one or more communication protocols associated with communications, such that the network 140, the ASE data server 112, the replication server 114, and/or the RMA 116 are operable to communicate physical signals with the interface 104 within and outside of the illustrated system 100.

Network 140 facilitates wireless or wireline communications between the components of the system 100 (e.g., between primary node 102 and client 120 and among others), as well as with any other local or remote computer, such as additional clients, servers, or other devices communicably coupled to network 140, including those not illustrated in FIG. 1. In the illustrated system, the network 140 is depicted as a single network, but may be comprised of more than one network without departing from the scope of this disclosure, so long as at least a portion of the network 140 may facilitate communications between senders and recipients. In some instances, one or more of the illustrated components may be included within network 140 as one or more cloud-based services or operations. For example, the primary node 102 may be a cloud-based service. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11ac/ad/af/a/b/g/n, 802.20, WiMax, LTE, and/or any other appropriate wireless link. In other words, the network 140 encompasses any internal or external network, networks, sub-network, or combination thereof operable to facilitate communications between various computing components inside and outside the illustrated system 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the primary node 102 includes a processor 106. Although illustrated as a single processor 106 in FIG. 1, two or more processors may be used according to particular needs, desires, or particular implementations of the system 100. Each processor 106 may be a central processing unit (CPU), an application-specific integrated circuit (ASIC), a field-programmable gate array (FPGA), or another suitable component. Generally, the processor 106 executes instructions and manipulates data to perform the operations of the primary node 102. Specifically, the processor 106 executes the algorithms and operations described in the illustrated figures, including the operations performing the functionality associated with the primary node 102 generally, as well as the various software modules (e.g., the ASE data server 112, the replication server 114, the RMA 116), including the functionality for sending communications to and receiving transmissions from client 120, standby node 122, and external replication system 142.

As illustrated, primary node 102 includes memory 110, or multiple memories 110. The memory 110 may include any memory or database module and may take the form of volatile or non-volatile memory including, without limitation, magnetic media, optical media, random access memory (RAM), read-only memory (ROM), removable media, or any other suitable local or remote memory component. The memory 110 may store various objects or data, including financial and/or business data, application information including URLs and settings, user information, behavior and access rules, administrative settings, password information, caches, backup data, repositories storing business and/or dynamic information, and any other appropriate information including any parameters, variables, algorithms, instructions, rules, constraints, or references thereto associated with the purposes of the primary node 102. Additionally, the memory 110 may store any other appropriate data, such as VPN applications, firmware logs and policies, firewall policies, a security or access log, print or other reporting files, as well as others.

The primary node 102 also includes an ASE data server 112. The ASE data server 112 provides database service to client 120. As described above, the ASE data server 112 can be a primary data server that the client 120 connects to and works on, and a standby data server that data activities of the client 120 are replicated to. In operation, the ASE data server 112 receives instructions from RMA 116 to switch its role between a primary data server and a standby data server. In addition, the ASE data server 112 receives instructions from RMA 116 to switch its data replication between a remote topology and a local topology.

The primary node 102 also includes a replication server 114. The replication server 114 replicates data to the external replication system 142 and/or applies the data to its local ASE data server (i.e., the ASE data server 112) when the ASE data server 112 is a standby data server.

The primary node 102 also includes an RMA 116. RMA is responsible of performing a failover process. In operation, the RMA 116 sends instructions to its local data server (i.e., the ASE data server 112) to switch its role between a primary data server and a standby data server. In addition, the RMA 116 sends instructions to its local data server (i.e., the ASE data server 112) to switch its data replication between a remote topology and a local topology. The details of these operations will be described below with regard to the standby node 122.

Regardless of the particular implementation, "software" includes computer-readable instructions, firmware, wired and/or programmed hardware, or any combination thereof on a tangible medium (transitory or non-transitory, as appropriate) operable, when executed, to perform at least one of the processes and operations described herein. In fact, each software component may be fully or partially written or described in any appropriate computer language, including C, C++, JavaScript, JAVA™, VISUAL BASIC, assembler, Perl®, any suitable version of 4GL, as well as others.

Client 120 may be any computing device operable to connect to or communicate with primary node 102, standby node 122, other clients (not illustrated), or other components via network 140, as well as with the network 140 itself, using a wireline or wireless connection, and can include a desktop computer, a mobile device, a tablet, a server, or any other suitable computer device. In general, client 120 comprises an electronic computer device operable to receive, transmit, process, and store any appropriate data associated with the system 100 of FIG. 1.

The illustrated client 120 is intended to encompass any computing device such as a desktop computer, laptop/notebook computer, mobile device, smartphone, personal data assistant (PDA), tablet computing device, one or more processors within these devices, or any other suitable processing device. For example, the client 120 may comprise a computer that includes an input device, such as a keypad, touch screen, or other device that can accept user information, and an output device that conveys information associated with the operation of the client 120 itself. Further, while illustrated as a client system, client 120 may be exchanged with another suitable source in other implementations, and is not meant to be limiting.

As illustrated, standby node 122 includes an interface 124, a processor 126, an optional GUI 128, memory 130, an ASE data server 132, a replication server 134, and an RMA 136. In general, the standby node 122 is a simplified representation of one or more systems and/or servers that provide the described functionality, and is not meant to be limiting, but rather an example of the systems possible.

Interface 124 and processor 126 may be similar to, or different from, the interface 104 and processor 106 described with regard to primary node 102. In general, processor 126 executes instructions and manipulates data to perform the operations of the standby node 122. Specifically, the processor 126 can execute some or all of the algorithms and operations described in the illustrated figures, including the operations performing the functionality associated with the ASE data server 132, the replication server 134, the RMA 136, and the other components of the standby node 122. Similarly, interface 124 provides the standby node 122 with the ability to communicate with other systems in a distributed environment—including within the system 100—connected to the network 140.

Memory 130 may be similar to, or different from, memory 110 of the primary node 102. In general, memory 130 may store various objects or data, including any parameters, variables, algorithms, instructions, rules, constraints, or references thereto, associated with the purposes of the standby node 122. Additionally, the memory 130 may store any other appropriate data, such as VPN applications, firmware logs and policies, firewall policies, a security or access log, print or other reporting files, as well as others.

The standby node 122 also includes an ASE data server 132. The ASE data server 132 provides database service to client 120. When being a standby data server, the ASE data server 132 replicates data activities that the client 120 performed on the primary data server (e.g., the ASE data server 112). During a failover, the ASE data server 132 receives instructions from RMA 136 that promote the ASE data server 132 to a new primary data server. As a result, the ASE data server 132 connects to the client 120 and provides database service to the client 120. In addition, the ASE data server 132 may receive instructions from RMA 136 to switch its data replication to a local topology. In the local topology, the ASE data server 132 sends replication data to its local replication server (i.e., replication server 134) for replicating to the external replication system.

The standby node 122 also includes a replication server 134. When the ASE data server 132 is promoted to a new primary data server and the data replication topology is switched to local, the replication server 134 receives instructions from the RMA 136 to perform data replication from the ASE data server 132 to the external replication system.

The standby node 122 also includes an RMA 136. When the ASE data server 132 is a standby data server, the RMA 136 may receive instructions from a fault manager 160 to perform a failover process. In some implementations, the fault manager 160 may be a component of the example system 100 that monitors the status of a data server and/or a replication server on a primary node, and informs an RMA on a standby node. If both the data server and the replication server on the primary node are down, an unplanned failover is triggered (e.g., the fault manager 160 informs the RMA 136 to perform an unplanned failover process). In the unplanned failover, the RMA 136 sends instructions to its local data server (i.e., the ASE data server 132) to become a new primary data server immediately. As a result, the client 120 can connect to the new primary data server to continue its work. In addition, the RMA 136 sends instructions to its local data server (i.e., the ASE data server 132) to switch its data replication topology to a local topology. In some implementations, after the failed data server and the failed replication server recover, the fault manager 160 informs the RMA 136, and the RMA 136 can send instructions to its local data server (i.e., the ASE data server 132) to switch back its data replication topology to a remote topology.

As illustrated, external replication system 142 includes an interface 144, a processor 146, an optional GUI 148, memory 150, a data server 152, and a replication server 154. In general, the external replication system 142 (e.g., an external node) is a simplified representation of one or more systems and/or servers that provide the described functionality, and is not meant to be limiting, but rather an example of the systems possible.

Interface 144 and processor 146 may be similar to, or different from, the interface 104 and the processor 106 described with regard to primary node 102. In general, the processor 146 executes instructions and manipulates data to perform the operations of the external replication system 142. Specifically, the processor 146 can execute some or all of the algorithms and operations described in the illustrated figures, including the operations performing the functionality associated with the replication server 154 and the other components of the external replication system 142. Similarly, interface 144 provides the external replication system 142 with the ability to communicate with other systems in a distributed environment—including within the system 100—connected to the network 140.

Memory 150 may be similar to or different from memory 110 of the primary node 102. In general, memory 150 may store various objects or data, including any parameters, variables, algorithms, instructions, rules, constraints, or references thereto, associated with the purposes of the external replication system 142. Additionally, the memory 150 may store any other appropriate data, such as VPN applications, firmware logs and policies, firewall policies, a security or access log, print or other reporting files, as well as others.

Data server 152 and replication server 154 may be similar to, or different from, the ASE data server 112 and the replication server 114, described with regard to primary node 102. In general, the replication server 154 receives replication data from replication server 114 on primary node 102 and/or replication server 134 on standby node 122. In addition, the replication server 154 applies the replication data to the data server 152.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate.

Figure 2:
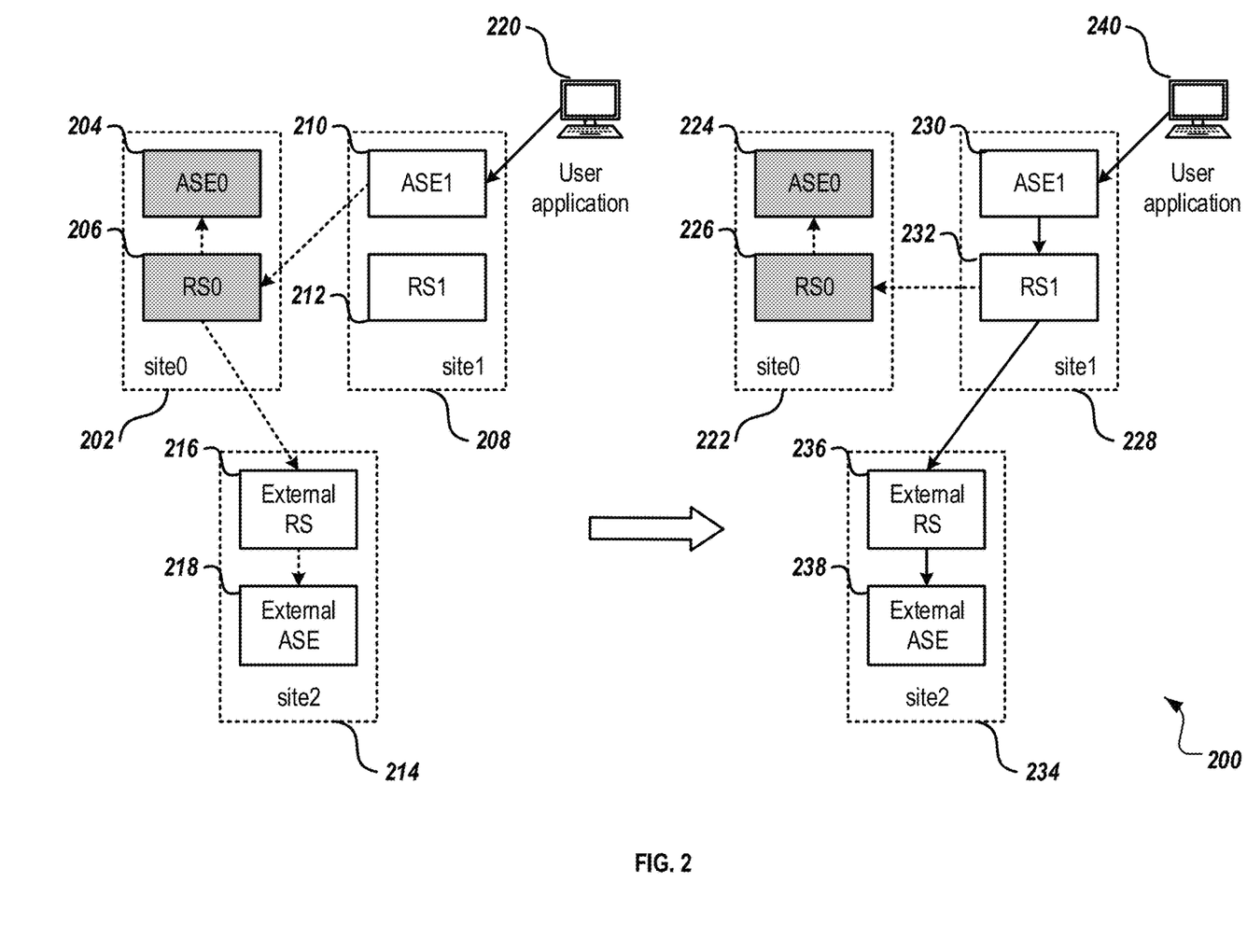
FIG. 2 is a block diagram illustrating an example data replication flow during a failover operation, according to an implementation.

FIG. 2 is a block diagram illustrating an example data replication flow 200 during a failover operation. In some implementations, FIG. 2 may include additional and/or different components, not shown in the diagram. Components may also be omitted from FIG. 2, and additional flows may be added to or performed by the components of FIG. 2.

The components illustrated in FIG. 2 may be similar to, or different from, those described in FIG. 1.

FIG. 2 illustrates intermediate states of an ASE HADR with external replication system during a failover. The left side of FIG. 2 illustrates a default data replication flow based on a remote topology. As illustrated, the ASE HADR with external replication system includes a node 202 and a node 208 of a HADR cluster, and an external replication system 214. The node 202 includes an ASE data server 204 and a replication server 206. The node 208 includes an ASE data server 210 and a replication server 212. The external replication system 214 includes an external replication server 216 and an external data server 218. During a failover, for example, both the ASE data server 204 and the replication server 206 on the node 202 are down. User application 220, that was previously connected to the ASE data server 204 (e.g., the previous primary data server) on the node 202, connects to the ASE data server 210 (e.g., the newly promoted primary data server) on the node 208. In the remote topology, the ASE data server 210 should replicate data through the replication server 206 on the node 202 to the external replication server 216, which can apply the data on its local ASE data server (i.e., the external data server 218). At this point, data is cached at the ASE data server 210 and not replicated through the replication server 206 on the node 202, as indicated by dashed arrows. Since the replication server 206 is down during the failover, data replication from the ASE data server 210 to the external data server 218 will be blocked with the remote topology. If the replication server 206 cannot recover quickly, the external replication availability of the HADR system can be affected by the HADR cluster internal exception.

The right side of FIG. 2 illustrates a data replication flow of the HADR system after switching to a local topology. As illustrated, during a failover, user application 240, that was previously connected to the ASE data server 224 on the node 222, connects to the ASE data server 230 on the node 228. When determining that the replication server 226 on the node 222 is down during the failover, node 228 switches its data replication topology from the remote topology to a local topology. After switching to the local topology, data is replicated from the ASE data server 230 to its local replication server 232 on the node 228, and then to the external replication server 236 on the external replication system 234 as indicated by solid arrows. The external replication server 236 applies the data on its local ASE data server (i.e., the external data server 238). In the local topology, even when the replication server 226 is down during the failover, data can still be replicated from the ASE data server 230 to the external data server 238.

Figure 3:
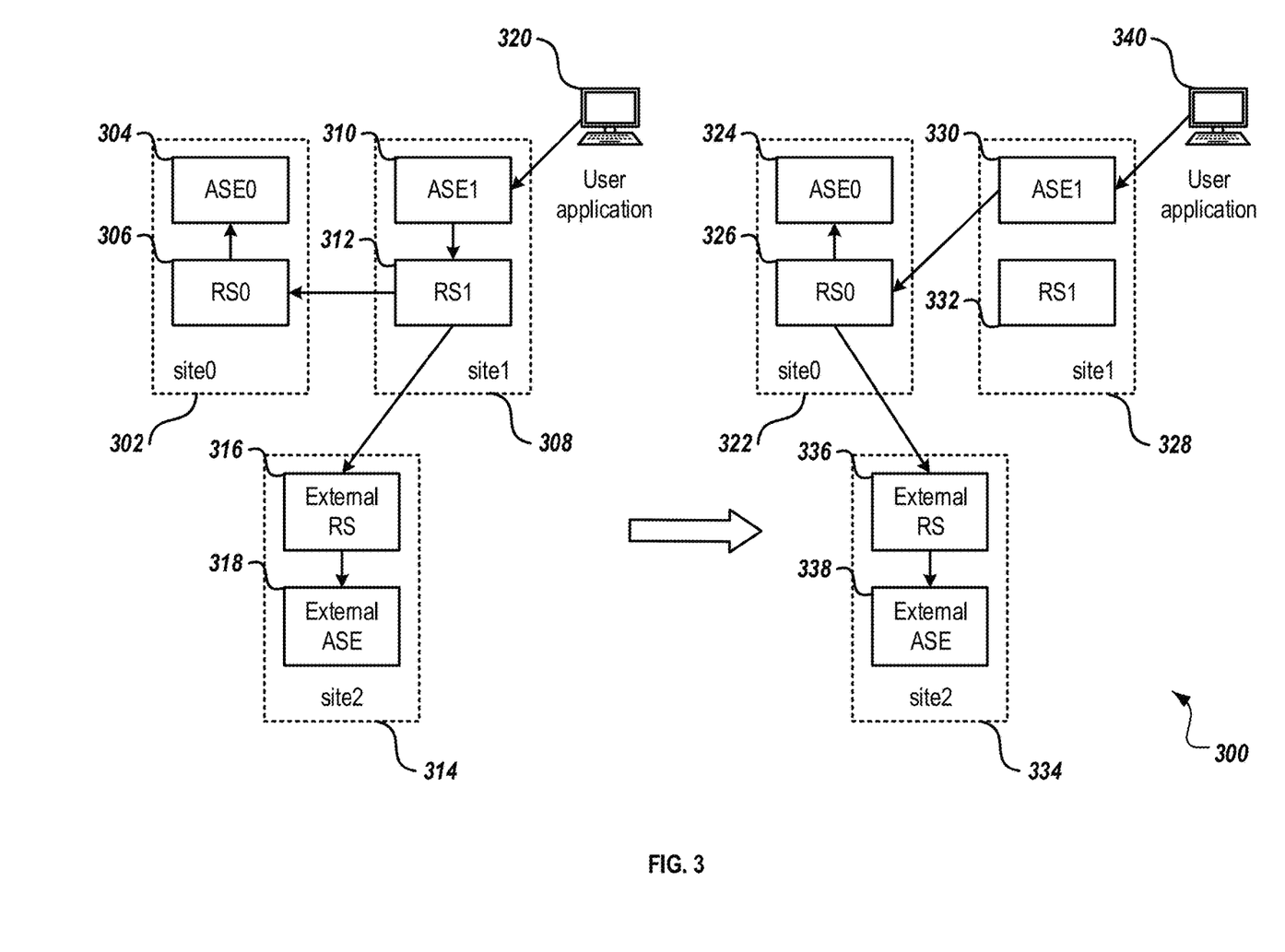
FIG. 3 is a block diagram illustrating an example data replication flow before and after switching a data replication topology from local to remote, according to an implementation.

FIG. 3 is a block diagram illustrating an example data replication flow 300 before and after switching a data replication topology from local to remote. In some implementations, FIG. 3 may include additional and/or different components not shown in the diagram. Components may also be omitted from FIG. 3, and additional flows may be added to or performed by the components of FIG. 3. The components illustrated in FIG. 3 may be similar to, or different from, those described in FIG. 1 and/or FIG. 2.

The left side of FIG. 3 illustrates a data replication flow of the ASE HADR with external replication system, implementing a local topology during a failover. As illustrated, user application 320 connects to the ASE data server 310 on the node 308 during the failover. In the local topology, data is replicated from the ASE data server 310 to its local replication server 312 on the node 308. The replication server 312 routes the data to the replication server 306 on the node 302 and the external replication server 316 on the external replication system 314. The replication server 306 applies the data on the ASE data server 304. The external replication server 316 applies the data on its local ASE data server (i.e., the external data server 318). With the local topology, during the down time of the replication server 306, data can still be replicated from the ASE data server 310 to the external data server 318 as described in FIG. 2. After the node 302 recovers (e.g., both the ASE data server 304 and the replication server 306 recover), replication topology of the HADR system can be switched back from local to remote automatically, when executing the rest failover command.

The right side of FIG. 3 illustrates a data replication flow of the HADR system after switching a data replication topology from local to remote. As illustrated, user application 340 remains connected to the ASE data server 330 on the node 328 after the replication topology switching from local to remote, thereby switching the primary node of the system after the failover. With the remote topology, data is replicated from the ASE data server 330 to the replication server 326 on the node 322, instead of to the replication server 332 on the node 328. The replication server 326 applies the data on the ASE data server 324 and, at the same time, routes the data to the external replication server 336 on the external replication system 334. The external replication server 336 applies the data on its local ASE data server (i.e., the external data server 338).

Figure 4:
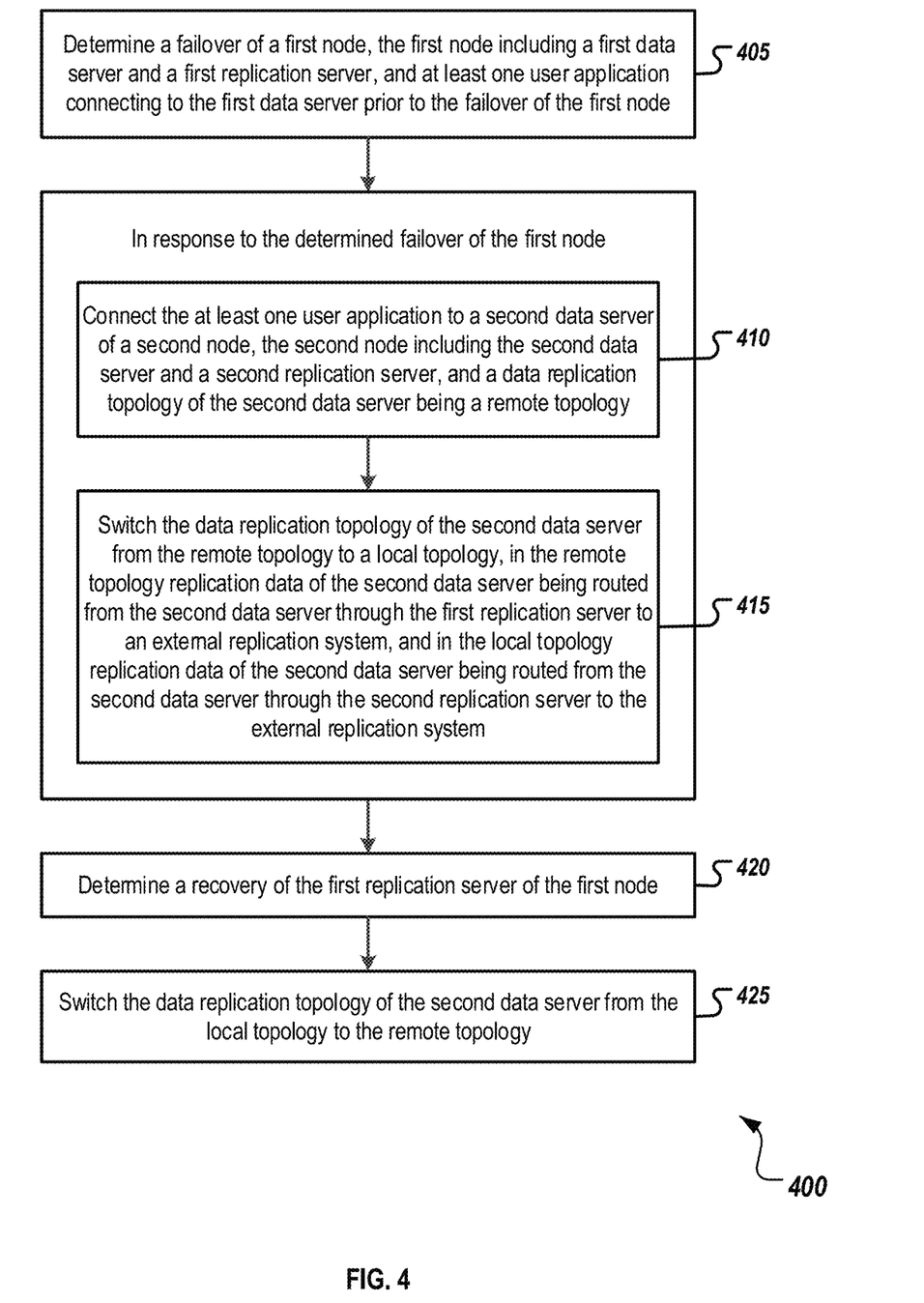
FIG. 4 is a flowchart of an example method for performing dynamic topology switch in a failover operation, according to an implementation.

FIG. 4 is a flowchart of an example method 400 for performing dynamic topology switch in a failover operation. It will be understood that method 400 and related methods may be performed, for example, by any suitable system, environment, software, and hardware, or a combination of systems, environments, software, and hardware, as appropriate. For example, one or more of a client, a server, or other suitable computing device can be used to execute method 400 and related methods and obtain any data from the memory of a client, server, or other computing device. In some implementations, the method 400 and related methods are executed by one or more components of the system 100 described above with respect to FIG. 1. For example, the method 400 and related methods can be executed by the standby node 122 of FIG. 1.

At 405, a failover of a first node is determined. The first node is a primary node of an ASE HADR with external replication system prior to the failover. In this example, the HADR system includes the first node, a second node, and an external replication system (e.g., an external node). The first node includes a first data server and a first replication server. The second node is a standby node of the HADR system prior to the failover, and includes a second data server and a second replication server. The external replication system includes an external ASE data server and an external replication server. The first data server is a primary ASE data server and the second data server is a standby ASE data server prior to the failover. In some implementations, the first node and second node are logical nodes in the HADR system, and can switch roles between a primary node and a standby node. Prior to the failover of the first node, at least one user application connects to the first data server, and data activities performed by the at least one user application on the first data server are replicated via the second replication server (i.e., a remote topology for data replication). In some implementations, the failover of the first node is an unplanned failover. The unplanned failover of the first node is triggered by a failure of both the first data server and the first replication server. In response to the determined failover of the first node, the following operations (i.e., 410 and 415) are performed.

At 410, the at least one user application is connected to the second data server on the second node. In some implementations, the second data server is promoted to a new primary data server in response to the determined failover of the first node. Prior to the failover of the first node, data replication topologies of both the first and second data servers are remote topology. In the remote topology, replication data of the second data server is routed from the second data server through the first replication server to the external replication system. In some implementations, if the first replication server on the first node is working during the failover, the data replication topology of the second data server remains unchanged (i.e., in the remote topology) and, as a result, the method 400 ends at 410.

At 415, the data replication topology of the second data server is switched from the remote topology to a local topology. In some implementations, the topology switch is performed in response to a determination that the first replication server on the first node is down during the failover. In the local topology, replication data of the second data server is routed from the second data server through the second replication server to the external replication system. In some implementations, the topology switch is performed automatically in response to the determined failover of the first node. In some implementations, the topology switch is performed manually by a user in response to the determined failover of the first node. For example, when provided with an indication of the determined failover of the first node, the user can execute a command to switch the HADR topology from remote to local temporarily during the failover of the first node.

At 420, a recovery of the first replication server of the first node is determined. In some implementations, the recovery of the first replication server of the first node includes a recovery of the first data server. In response to the determined recovery, the following operation (i.e., 425) is performed.

At 425, the data replication topology of the second data server is switched from the local topology to the remote topology. In the remote topology, replication data of the second data server is routed from the second data server through the first replication server to the external replication system. In some implementations, the at least one user application remains connected to the second data server after switching the data replication topology of the second data server from the local topology to the remote topology. In some implementations, switching the data replication topology of the second data server from the local topology to the remote topology is performed automatically, in response to the determined recovery of the first replication server of the first node. In some implementations, switching the data replication topology of the second data server from the local topology to the remote topology is performed manually, in response to the determined recovery of the first replication server of the first node. For example, the determined recovery of the first replication server of the first node includes an indication of the determined recovery being provided to a user. When provided with the indication of the determined recovery, the user can execute a command to switch back the HADR topology from local to remote.

The example method 400 shown in FIG. 4 can be modified or reconfigured to include additional, fewer, or different actions (not shown in FIG. 4), which can be performed in the order shown or in a different order. In some implementations, one or more of the actions shown in FIG. 4 can be repeated or iterated, for example, until a terminating condition is reached. In some implementations, one or more of the individual actions shown in FIG. 4 can be executed as multiple separate actions, or one or more subsets of the actions shown in FIG. 4 can be combined and executed as a single action. In some implementations, one or more of the individual actions shown in FIG. 4 may also be omitted from the example method 400.

Alternative methods of performing an accrual simulation may be used in other implementations. Those described herein are examples and are not meant to be limiting.

Described implementations of the subject matter can include one or more features, alone or in combination.

For example, in a first implementation, a computer-implemented method includes determining a failover of a first node, the first node including a first data server and a first replication server, and at least one user application connecting to the first data server prior to the failover of the first node; and in response to the determined failover of the first node, connecting the at least one user application to a second data server of a second node, the second node including the second data server and a second replication server, and a data replication topology of the second data server being a remote topology; and switching the data replication topology of the second data server from the remote topology to a local topology. In the remote topology, replication data of the second data server is routed from the second data server through the first replication server to an external replication system. In the local topology, replication data of the second data server is routed from the second data server, through the second replication server, to the external replication system.

The foregoing and other described implementations can each optionally include one or more of the following features:

A first feature, combinable with any of the following features, wherein the failover of the first node is an unplanned failover, and wherein the unplanned failover is triggered by a failure of both the first data server and the first replication server.

A second feature, combinable with any of the previous or following features, wherein the switching is performed automatically in response to the determined failover of the first node.

A third feature, combinable with any of the previous or following features, wherein prior to the failover of the first node, replication data of the first data server is routed from the first data server, through the second replication server, to the external replication system.

A fourth feature, combinable with any of the previous or following features, comprising, determining a recovery of the first replication server of the first node; and switching the data replication topology of the second data server from the local topology to the remote topology.

A fifth feature, combinable with any of the previous or following features, wherein the at least one user application connects to the second data server after switching the data replication topology of the second data server from the local topology to the remote topology.

A sixth feature, combinable with any of the previous or following features, wherein switching the data replication topology of the second data server from the local topology to the remote topology is performed automatically, in response to the determined recovery of the first replication server of the first node.

A seventh feature, combinable with any of the previous or following features, wherein switching the data replication topology of the second data server from the local topology to the remote topology is performed manually, in response to the determined recovery of the first replication server of the first node, and the determined recovery of the first replication server of the first node includes an indication of the determined recovery being provided to a user.

An eighth feature, combinable with any of the previous or following features, wherein the first node, the second node, and the external replication system are in an adaptive server enterprise (ASE) high availability disaster recovery (HADR) with external replication system, and the first and second data servers are ASE data servers.

In a second implementation, a computer program product comprising computer-readable instructions, which, when loaded and executed on a computer system, cause the computer system to perform operations comprising: determining a failover of a first node, the first node including a first data server and a first replication server, and at least one user application connecting to the first data server prior to the failover of the first node; and in response to the determined failover of the first node, connecting the at least one user application to a second data server of a second node, the second node including the second data server and a second replication server, and a data replication topology of the second data server being a remote topology; and switching the data replication topology of the second data server from the remote topology to a local topology. In the remote topology, replication data of the second data server is routed from the second data server through the first replication server to an external replication system. In the local topology, replication data of the second data server is routed from the second data server, through the second replication server, to the external replication system.

The foregoing and other described implementations can each, optionally include one or more of the following features:

A first feature, combinable with any of the following features, wherein the failover of the first node is an unplanned failover, and wherein the unplanned failover is triggered by a failure of both the first data server and the first replication server.

A second feature, combinable with any of the previous or following features, wherein the switching is performed automatically, in response to the determined failover of the first node.

A third feature, combinable with any of the previous or following features, wherein prior to the failover of the first node, replication data of the first data server is routed from the first data server, through the second replication server, to the external replication system.

A fourth feature, combinable with any of the previous or following features, comprising, determining a recovery of the first replication server of the first node; and switching the data replication topology of the second data server from the local topology to the remote topology.

A fifth feature, combinable with any of the previous or following features, wherein the at least one user application connects to the second data server after switching the data replication topology of the second data server from the local topology to the remote topology.

A sixth feature, combinable with any of the previous or following features, wherein switching the data replication topology of the second data server from the local topology to the remote topology is performed automatically, in response to the determined recovery of the first replication server of the first node.

A seventh feature, combinable with any of the previous or following features, wherein switching the data replication topology of the second data server from the local topology to the remote topology is performed manually, in response to the determined recovery of the first replication server of the first node, and the determined recovery of the first replication server of the first node includes an indication of the determined recovery being provided to a user.

An eighth feature, combinable with any of the previous or following features, wherein the first node, the second node, and the external replication system are in an ASE HADR with external replication system, and the first and second data servers are ASE data servers.

In some implementations, the computer program product can be implemented on a non-transitory, computer-readable medium storing one or more instructions executable by a computer system to perform the above-described operations.

In a third implementation, a computer system, comprising: one or more processors; and a computer-readable medium storing instructions executable by the one or more processors to perform operations comprising: determining a failover of a first node, the first node including a first data server and a first replication server, and at least one user application connecting to the first data server prior to the failover of the first node; and in response to the determined failover of the first node, connecting the at least one user application to a second data server of a second node, the second node including the second data server and a second replication server, and a data replication topology of the second data server being a remote topology; and switching the data replication topology of the second data server from the remote topology to a local topology. In the remote topology, replication data of the second data server is routed from the second data server through the first replication server to an external replication system. In the local topology, replication data of the second data server is routed from the second data server through the second replication server to the external replication system.

The foregoing and other described implementations can each, optionally include one or more of the following features:

A first feature, combinable with any of the following features, wherein the failover of the first node is an unplanned failover, and wherein the unplanned failover is triggered by a failure of both the first data server and the first replication server.

A second feature, combinable with any of the previous or following features, wherein the switching is performed automatically, in response to the determined failover of the first node.

A third feature, combinable with any of the previous or following features, wherein prior to the failover of the first node, replication data of the first data server is routed from the first data server through the second replication server to the external replication system.

A fourth feature, combinable with any of the previous or following features, comprising, determining a recovery of the first replication server of the first node; and switching the data replication topology of the second data server from the local topology to the remote topology.

A fifth feature, combinable with any of the previous or following features, wherein the at least one user application connects to the second data server after switching the data replication topology of the second data server from the local topology to the remote topology.

A sixth feature, combinable with any of the previous or following features, wherein switching the data replication topology of the second data server from the local topology to the remote topology is performed automatically, in response to the determined recovery of the first replication server of the first node.

A seventh feature, combinable with any of the previous or following features, wherein switching the data replication topology of the second data server from the local topology to the remote topology is performed manually, in response to the determined recovery of the first replication server of the first node, and the determined recovery of the first replication server of the first node includes an indication of the determined recovery being provided to a user.

An eighth feature, combinable with any of the previous or following features, wherein the first node, the second node, and the external replication system are in an ASE HADR with external replication system, and the first and second data servers are ASE data servers.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable, computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including, by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A non-transitory computer storage medium encoded with a computer program, the program comprising instructions that, when executed by one or more computers, cause the one or more computers to perform operations comprising:
   determining a failover of a first node, wherein the first node includes a first data server and a first replication server, and wherein at least one user application connects to the first data server prior to the failover of the first node;
   in response to the determined failover of the first node including a failure of the first replication server:
      connecting the at least one user application to a second data server of a second node, wherein the second node includes the second data server and a second replication server, and wherein a data replication topology of the second data server is a remote topology; and
      in response to connecting the at least one user application to the second data server of the second node, switching the data replication topology of the second data server from the remote topology to a local topology, wherein, in the remote topology, replication data of the second data server in the second node is routed from the second data server in the second node through the first replication server in the first node to an external replication system, wherein, in the local topology, replication data of the second data server in the second node is routed from the second data server in the second node through the second replication server in the second node to the external replication system, and wherein prior to the failover of the first node, replication data of the first data server in the first node is routed from the first data server in the first node through the second replication server in the second node to the external replication system; and
   in response to the determined failover of the first node not including a failure of the first replication server:
      connecting the at least one user application to the second data server of the second node, wherein the second node includes the second data server and the second replication server, and wherein the data replication topology of the second data server is a remote topology; and
      in response to connecting the at least one user application to the second data server of the second node, maintaining the data replication topology of the second data server as the remote topology, wherein, in the remote topology, replication data of the second data server in the second node is routed from the second data server in the second node through the first replication server in the first node to an external replication system.

2. The medium of claim 1, wherein the failover of the first node is an unplanned failover, and wherein the unplanned failover is triggered by a failure of both the first data server and the first replication server.

3. The medium of claim 1, wherein the switching is performed automatically in response to the determined failover of the first node.

4. The medium of claim 1, further comprising:
   determining a recovery of the first replication server of the first node; and
   switching the data replication topology of the second data server from the local topology to the remote topology.

5. The medium of claim 4, wherein the at least one user application connects to the second data server after switching the data replication topology of the second data server from the local topology to the remote topology.

6. The medium of claim 4, wherein switching the data replication topology of the second data server from the local topology to the remote topology is performed automatically, in response to the determined recovery of the first replication server of the first node.

7. The medium of claim 4, wherein switching the data replication topology of the second data server from the local topology to the remote topology is performed manually, in response to the determined recovery of the first replication server of the first node, wherein the determined recovery of the first replication server of the first node includes an indication of the determined recovery being provided to a user.

8. The medium of claim 1, wherein the first node, the second node, and the external replication system are in an adaptive server enterprise (ASE) high availability disaster recovery (HADR) with external replication system, and the first and second data servers are ASE data servers.

9. A computerized method performed by one or more processors, the method comprising:
   determining a failover of a first node, wherein the first node includes a first data server and a first replication server, and wherein at least one user application connects to the first data server prior to the failover of the first node;
   in response to the determined failover of the first node including a failure of the first replication server:
      connecting the at least one user application to a second data server of a second node, wherein the second node includes the second data server and a second replication server, and wherein a data replication topology of the second data server is a remote topology; and
      in response to connecting the at least one user application to the second data server of the second node, switching the data replication topology of the second data server from the remote topology to a local topology, wherein, in the remote topology, replication data of the second data server in the second node is routed from the second data server in the second node through the first replication server in the first node to an external replication system, wherein, in the local topology, replication data of the second data server in the second node is routed from the second data server in the second node through the second replication server in the second node to the external replication system, and wherein prior to the failover of the first node, replication data of the first data server in the first node is routed from the first data server in the first node through the second replication server in the second node to the external replication system; and in response to the determined failover of the first node not including a failure of the first replication server:

connecting the at least one user application to the second data server of the second node, wherein the second node includes the second data server and the second replication server, and wherein the data replication topology of the second data server is a remote topology; and in response to connecting the at least one user application to the second data server of the second node, maintaining the data replication topology of the second data server as the remote topology, wherein, in the remote topology, replication data of the second data server in the second node is routed from the second data server in the second node through the first replication server in the first node to an external replication system.

10. The method of claim 9, wherein the failover of the first node is an unplanned failover, and wherein the unplanned failover is triggered by a failure of both the first data server and the first replication server.

11. The method of claim 9, wherein the switching is performed automatically in response to the determined failover of the first node.

12. The method of claim 9, further comprising:
determining a recovery of the first replication server of the first node; and
switching the data replication topology of the second data server from the local topology to the remote topology.

13. The method of claim 12, wherein the at least one user application connects to the second data server after switching the data replication topology of the second data server from the local topology to the remote topology.

14. The method of claim 12, wherein switching the data replication topology of the second data server from the local topology to the remote topology is performed automatically, in response to the determined recovery of the first replication server of the first node.

15. The method of claim 12, wherein switching the data replication topology of the second data server from the local topology to the remote topology is performed manually, in response to the determined recovery of the first replication server of the first node, wherein the determined recovery of the first replication server of the first node includes an indication of the determined recovery being provided to a user.

16. The method of claim 9, wherein the first node, the second node, and the external replication system are in an adaptive server enterprise (ASE) high availability disaster recovery (HADR) with external replication system, and the first and second data servers are ASE data servers.

17. A system comprising:
one or more processors; and
a computer-readable medium storing instructions executable by the one or more processors to perform operations comprising:
determining a failover of a first node, wherein the first node includes a first data server and a first replication server, and wherein at least one user application connects to the first data server prior to the failover of the first node;
in response to the determined failover of the first node including a failure of the first replication server:
connecting the at least one user application to a second data server of a second node, wherein the second node includes the second data server and a second replication server, and wherein a data replication topology of the second data server is a remote topology; and
in response to connecting the at least one user application to the second data server of the second node, switching the data replication topology of the second data server from the remote topology to a local topology, wherein, in the remote topology, replication data of the second data server in the second node is routed from the second data server in the second node through the first replication server in the first node to an external replication system, wherein, in the local topology, replication data of the second data server in the second node is routed from the second data server in the second node through the second replication server in the second node to the external replication system, and wherein prior to the failover of the first node, replication data of the first data server in the first node is routed from the first data server in the first node through the second replication server in the second node to the external replication system; and in response to the determined failover of the first node not including a failure of the first replication server:
connecting the at least one user application to the second data server of the second node, wherein the second node includes the second data server and the second replication server, and wherein the data replication topology of the second data server is a remote topology; and
in response to connecting the at least one user application to the second data server of the second node, maintaining the data replication topology of the second data server as the remote topology, wherein, in the remote topology, replication data of the second data server in the second node is routed from the second data server in the second node through the first replication server in the first node to an external replication system.

18. The system of claim 17, wherein the failover of the first node is an unplanned failover, and wherein the unplanned failover is triggered by a failure of both the first data server and the first replication server.

* * * * *